US011946213B1

(12) United States Patent
Jing et al.

(10) Patent No.: US 11,946,213 B1
(45) Date of Patent: Apr. 2, 2024

(54) HIGH-SPEED TRAIN DERAILMENT ARRESTING SYSTEM AND STRUCTURAL DESIGN METHOD THEREFOR

(71) Applicant: Southwest Jiaotong University, Chengdu (CN)

(72) Inventors: Lin Jing, Chengdu (CN); Shaoxuan Zhang, Chengdu (CN); Kai Liu, Chengdu (CN); Kaiyun Wang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/381,902

(22) Filed: Oct. 19, 2023

(30) Foreign Application Priority Data

Mar. 7, 2023 (CN) .......................... 202310206175.7

(51) Int. Cl.
*E01F 15/04* (2006.01)

(52) U.S. Cl.
CPC ...... *E01F 15/0415* (2013.01); *E01F 15/0461* (2013.01)

(58) Field of Classification Search
CPC ......... E01F 15/00; E01F 15/003; E01F 15/02; E01F 15/04; E01F 15/0407; E01F 15/0415; E01F 15/043; E01F 15/0461; E01B 26/00; B61F 9/00
See application file for complete search history.

(56) References Cited

U.S. PATENT DOCUMENTS

| | | | |
|---|---|---|---|
| 6,427,411 B2* | 8/2002 | Shows ...................... | E02B 3/26 180/270 |
| 6,520,711 B2* | 2/2003 | Kim .................... | E01F 15/0492 404/6 |
| 8,282,082 B2* | 10/2012 | An ........................ | E01F 15/025 256/65.03 |
| 2013/0017015 A1* | 1/2013 | Chae ................... | E01F 15/0492 404/6 |

FOREIGN PATENT DOCUMENTS

| | | | | |
|---|---|---|---|---|
| CN | 102923154 A | | 2/2013 | |
| CN | 103205941 B | | 5/2015 | |
| CN | 105383511 A | | 3/2016 | |
| CN | 205737571 U | | 11/2016 | |
| CN | 110696868 A | | 1/2020 | |
| CN | 113106794 A | * | 7/2021 | ............ E01B 26/00 |
| CN | 115182284 A | | 10/2022 | |
| KR | 101052624 B1 | * | 7/2011 | |

OTHER PUBLICATIONS

Chinese Office Action dated May 19, 2023; Chinese Application No. 202310206175.7.
Xiao Hua-de, et al. "A Simplified Collision Model of Collision between Vehicle and Cable Barrier"; Transport Standardization.1 Half of Dec. 2010 (No. 234).

* cited by examiner

*Primary Examiner* — Jonathan P Masinick
(74) *Attorney, Agent, or Firm* — Suiter Swantz pc llo

(57) ABSTRACT

A high-speed train derailment arresting system is provided, which includes multiple passive protection arresting devices arranged on both sides of a high-speed railway line. The passive protection arresting device includes a rigid support assembly fixed on a respective side of the high-speed railway line and a rotating protective barrel arranged on the support assembly. A structural design method for the high-speed train derailment arresting system is further provided.

3 Claims, 4 Drawing Sheets

HIGH-SPEED TRAIN DERAILMENT ARRESTING SYSTEM AND STRUCTURAL DESIGN METHOD THEREFOR

CROSS-REFERENCE TO RELATED APPLICATION

This patent application claims the benefit and priority of Chinese Patent Application No. 202310206175.7, entitled "HIGH-SPEED TRAIN DERAILMENT ARRESTING SYSTEM AND STRUCTURAL DESIGN METHOD THEREFOR" filed on Mar. 7, 2023, the disclosure of which is incorporated by reference herein in its entirety as part of the present application.

TECHNICAL FIELD

The present disclosure relates to the technical field of safety protection of rail transits, and in particular to a high-speed train derailment arresting system and a structural design method therefor.

BACKGROUND

High-speed railway, as the main artery of China economy, is favored by people for its advantages such as large capacity, low energy consumption, safety and comfort. However, in recent years, train derailment accidents have occurred frequently in China and at abroad, which has seriously threatened the production safety of railways. With the increase of operating speed, high-speed trains have put forward more stringent requirements for their service safety. At present, high-speed rail in China is at a critical stage of moving towards higher speed. Therefore, it is of great and far-reaching strategic significance to ensure the safety of train operation and minimize the economic loss once the train derailment occurs.

At present, for the protection of safety accidents such as derailment of high-speed trains, most of main measures taken are active control measures, which are used to limit the derailment of trains by installing auxiliary devices on the bogies or wheel sets and steel rails of trains. Patent CN205737571U discloses "an anti-derailment device for a rail vehicle", in which L-shaped positioning plates are installed on the train wheel axle through bearings, and a fixing connecting plate for fixing the L-shaped positioning plate is arranged between the L-shaped positioning plate and the bearing, a positioning block with a limiting plate is fixed to a railway sleeper, and the train wheel is limited based on the interaction between the L-shaped positioning plate and the limiting plate, thereby playing a role of anti-derailment. Patent CN102923154A discloses "an anti-derailment device for a rail train" and provides a scheme of anti-derailment hook. An upper end of the anti-derailment hook is buckled on a chassis girder of the train, and a lower end of the anti-derailment hook is buckled on a track and fastened with fastening bolts. Reinforcing ribs are arranged on both sides of the hook to enhance a tensile force of the anti-derailment hook, and a derailment behavior of the train is limited by resisting the tensile force generated by the hook during derailment. Patent CN105383511A discloses "an anti-derailment device for a railway vehicle bogie frame". In this device, an anti-derailment slide plate extending to a ground track is installed at a bottom of the train bogie frame. Through a lateral positioning of the anti-derailment slide plate on a mounting seat and an extension length in a vertical direction, the train is still constrained by a lateral limit node formed by the anti-derailment slide plate and the ground track when climbing the track, so as to prevent rail vehicles from derailing in operation.

In addition, few of measures taken are passive control measures, so as to reduce losses in all aspects caused by train derailment. Patent CN103205941B discloses "a train derailment impact protection device based on multiple defensive lines" which provides a train derailment impact protection device based on four defensive lines, such as a wheel protecting rail, a protecting retaining wall, an energy absorbing retaining block and a protecting hoop, which not only can improve the safety of a station building being impacted, but also can minimize the possible secondary injuries to the derailed train and personnel inside the train.

The above train anti-derailment devices based on active safety protection measures can indeed achieve the purpose of preventing train derailment in some aspects. However, under the condition of high-speed operation, the impact and wear between the train and auxiliary devices are inevitable, and the friction between some devices and the track cannot be completely avoided when the train passes through the curve, which lead to numerous influences on the normal running of the train and the operation and maintenance of the railway line. In addition, for some sudden train derailment accidents caused by objective reasons such as climate reasons, line emergencies and signal scheduling, these active safety protection devices may not serve an effective protection purpose. Therefore, the passive safety protection measures of trains have been placed on high expectations. However, there is little research on passive safety protection of trains at present. One of the few passive safety protection measures mentioned above is mainly used to protect the structure of train stations, and only plays an auxiliary role in protecting derailed trains and personnel inside the trains.

SUMMARY

In order to solve the problem in the prior art, the embodiments aim to provide a high-speed train derailment arresting system and a structural design method therefor. Based on impact energy conversion and dissipation, the embodiments aim to make up the deficiencies of passive safety protection when a high-speed train derails, so as to achieve purposes of effectively arresting the derailed train and protecting the safety of drivers and passengers, and minimizing losses in all aspects once rail train derailment occurs as much as possible. Meanwhile, the system can complement an active safety protection device for preventing a train from derailing, so as to commonly constitute two barriers for the safety protection of the high-speed train.

In order to achieve the purposes, the present disclosure adopts the technical solution as follows. The high-speed train derailment arresting system includes multiple passive protection arresting devices arranged on both sides of a high-speed railway line. Each of the multiple passive protection arresting device includes a rigid support assembly fixed to a respective side of the high-speed railway line and a rotating protective barrel arranged on the support assembly.

In some embodiments, the rigid support assembly may include cross beams, clamps, and an upright post fixed to the respective side of the high-speed railway line, the rotating protective barrel may be sleeved on the upright post and supported by the cross beams, and the cross beams may be fixed to the upright post through the clamps.

In some embodiments, the upright post, the cross beams and the clamps may be made of steel.

In some embodiments, the rotating protective barrel may include a stainless-steel inner shell and a stainless-steel outer shell, and a foam energy-absorbing layer may be arranged between the stainless-steel inner shell and the stainless-steel outer shell.

A structural design method for the high-speed train derailment arresting system is further disclosed by the present disclosure, including:

Step S1, calculating initial kinetic energy of a train, and listing an energy conservation equation of structures participating in energy absorption according to energy conservation, Step S2, setting an energy conversion rate that the high-speed train derailment arresting system needs to reach, simplifying the energy conservation equation of the Step S1 and preliminarily determining an energy absorption ratio of upright posts to rotating protective barrels, thereby determining an amount of energy absorbed by the upright posts and energy absorbed by the rotating protective barrels;

Step S3, estimating a number of the upright posts and a number of the rotating protective barrels participating in the energy absorption, further determining an average energy absorption value of the upright posts and an average energy absorption value of the rotating protective barrels, respectively, and designing a single upright post and a single rotating protective barrel according to the average energy absorption value of the upright posts and the average energy absorption value of the rotating protective barrels;

Step S4, according to a height of a train body of the train and a height from a nose tip of a high-speed train head to the ground, preliminarily setting a height of the upright posts while considering to reserve a design space for the rotating protective barrels, setting a transverse dynamic deformation value of the upright posts, calculating a rotation angle of a supporting hinge point of the upright posts, and listing a bending energy balance equation of the upright posts based on a Parkes model, thereby calculating a diameter of the upright posts, wherein the height of the upright posts includes a height above the ground and an embedded height of the upright posts in concrete foundation;

Step S5, according to the height from the nose tip of the high-speed train head to the ground, ensuring that the nose tip of the high-speed train head and a center of each of the rotating protective barrels are in a same horizontal plane, and preliminarily determining a height from the center of the rotating protective barrels to the ground; preliminarily setting a height of the foam energy-absorbing layer according to a front end structure of the high-speed train head, and obtaining average energy absorption value of the foam energy-absorbing layer per unit volume according to a stress-strain curve integral of a foam material, calculating an outer diameter of the foam energy-absorbing layer from the average energy absorption value of the foam energy-absorbing layer and the average energy absorption value of the rotating protective barrel in the Step S3 through a simultaneous equation, and correcting a value of the outer diameter of the foam energy-absorbing layer; and Step S6, properly selecting a dimension of the cross beams, a dimension of the clamps, a dimension of slewing rings, a dimension of bolts and a dimension of nuts as long as structural and functional requirements are satisfied.

In some embodiments, in the Step S1, the energy conservation equation of the structures participating in energy absorption may be obtained as follows:

$$E_{total} = \frac{1}{2}mv_1^2 = E_{post} + E_{barrel} + E_1 + E_2 + E_3 + \frac{1}{2}mv_2^2$$

where m may be a mass of the train, $v_1$ may be a speed before a collision between the train and the high-speed train derailment arresting system, $E_{post}$ may be a sum of energy absorbed by all upright posts, $E_{barrel}$ may be a sum of energy absorbed by all rotating protective barrels, $E_1$ may be a friction work between the train and a ground, $E_2$ may be energy absorbed by train deformation, $E_3$ may include a friction work between the rotating protective barrels and the upright posts, the slewing rings and the train, a friction work between the slewing rings and the cross beams, the clamps and the upright posts, and energy absorbed by the cross beams, the clamps, the bolts, the nuts and the slewing rings, and $v_2$ may be a speed of the train when the high-speed train derailment arresting system completes a guiding effect on the train.

In some embodiments, in the Step S2, the energy conversion rate that the high-speed train derailment arresting system may need to reach may be set, the energy conservation equation in the Step S1 may be simplified, the friction work $E_1$ between the train and the ground, the energy $E_2$ absorbed by train deformation, $E_3$ which may include the friction work between the rotating protective barrels and the upright posts, the slewing rings and train, the friction work between the slewing rings and the cross beams, the clamps and the upright posts, and the energy absorbed by the cross beams, the clamps, the bolts, the nuts and the slewing rings may be ignored, thus an energy equation may be obtained as follows:

$$E_4 = E_{post} + E_{barrel} = \frac{1}{2}mv_1^2(1-k)$$

where k may be the energy conversion rate, and $$k = \frac{\frac{1}{2}mv_2^2}{\frac{1}{2}mv_1^2}.$$

In some embodiments, in the Step S2, assuming that the sum of the energy absorbed by all upright posts accounts for $\beta$ of $E_4$, the energy absorbed by the upright posts and the energy absorbed by the rotating protective barrels may be determined as follows:

$$E_{post} = \beta E_4 = \frac{1}{2}\beta mv_1^2(1-k)$$

$$E_{barrel} = (1-\beta)E_4 = \frac{1}{2}(1-\beta)mv_1^2(1-k).$$

In some embodiments, in the Step S3, estimating the number of the upright posts and the number of the rotating protective barrels participating in the energy absorption may be obtained specifically as follows:

$$n \approx \frac{c}{f}$$

where c may be a length of a portion of the high-speed train derailment arresting system that may interact with the train in a period from the train may come into contact with the high-speed train derailment arresting system until the high-speed train derailment arresting system may complete a guiding effect on the train, f may be a spacing between adjacent upright posts of the upright posts, and n may be an integer.

In some embodiments, in the Step S3, a method for respectively determining the average energy absorption value of the upright posts and the average energy absorption value of the rotation protective barrels may be obtained as follows:

$$E_{post\,x} = \frac{E_{post}}{n} = \frac{E_{post\,1} + E_{post\,2} + E_{post\,3} + \ldots + E_{post\,n}}{n}$$

$$E_{barrel\,y} = \frac{E_{barrel}}{n} = \frac{E_{barrel\,1} + E_{barrel\,2} + E_{barrel\,3} + \ldots + E_{barrel\,n}}{n}$$

where $E_{post\,n}$ may be energy absorbed by a n-th deformed upright post of the upright posts, and $E_{barrel\,n}$ may be energy absorbed by a n-th deformed rotating protective barrel of the rotating protective barrels.

As the stainless-steel outer shell mainly may play a protective role on the foam energy-absorbing layer, a thickness of a stainless-steel layer of the stainless-steel outer shell in a preliminary design may be low; and in order to simplify calculation, an energy absorption effect of the stainless-steel outer shell may be ignored, and only energy absorption $E_{absorption\,y}$ of the foam energy-absorbing layer may be considered, that may be:

$$E_{absorption\,y} = E_{barrel\,y}.$$

In some embodiments, in the Step S4, a bending energy balance equation of the upright post listed based on the Parkes model is obtained as follows:

$$E_{post\,x} = M_u \theta = \sigma_s W_s \theta = \sigma_s \alpha W_2 \theta = \sigma_s \alpha \frac{\pi D_{post}^3}{32} \theta$$

where $M_u$ may be an ultimate bending moment, $\theta$ may be a rotation angle of the supporting hinge point, $\sigma_s$ may be yield strength of a material, $W_s$ may be a plastic bending section coefficient, $W_z$ may be a bending section coefficient, where the bending section coefficient of a circular section may be $$W_z = \frac{\pi D_{post}^3}{32},$$

α may be a section shape coefficient, the section shape coefficient of the circular section may be $$\alpha = \frac{16}{3\pi},$$

and $D_{post}$ may be the diameter of the upright posts.

In some embodiments, in the Step S3, a method for calculating a rotation angle of a supporting hinge point may be obtained as follows:

$$\theta \approx \frac{\pi \arcsin\left(\frac{P}{l_1}\right)}{180°}$$

where P may be a transverse dynamic deformation value of the upright posts that may be a transverse horizontal displacement of the upright posts relative to an initial position after bending deformation, and $l_1$ may be the height of the upright posts above the ground.

In some embodiments, in the Step S4, a method for calculating the diameter of the upright posts may be obtained as follows:

$$D_{post} = \sqrt[3]{\frac{3\beta m v_1^2 (1-k)}{\sigma_3 c \frac{\pi \arcsin\left(\frac{P}{l_1}\right)}{180°}}}.$$

in some embodiments, in the Step S5, a method for calculating an outer diameter of the foam energy-absorbing layer may be as follows:

the average energy absorption of the foam material per unit volume of the foam energy-absorbing layer may be obtained as follows:

$$e_f = \int_0^{\varepsilon_p} \sigma \, d\varepsilon$$

where ε may be strain, σ may be stress, and $\varepsilon_p$ may be average strain of the foam material of the energy-absorbing layer.

The volume of the foam energy-absorbing layer may be obtained as follows:

$$V_{absorption} = \frac{E_{absorption\,y}}{e_f}$$

$$V_{absorption} = \pi\left[\left(\frac{D_{absorption}}{2}\right)^2 - \left(\frac{d_{absorption}}{2}\right)^2\right] L_{absorption}$$

where $D_{absorption}$ may be the outer diameter of the foam energy-absorbing layer, $D_{absorption}$ may be an inner diameter of the foam energy-absorbing layer, and $L_{absorption}$ may be a height of the foam energy-absorbing layer.

Thus, the outer diameter $D_{absorption}$ of the foam energy-absorbing layer may be obtained as follows:

$$D_{absorption} = 2\sqrt{\frac{(1-\beta)fmv_1^2(1-k)}{2\pi ce_f L_{absorption}} + \left(\frac{d_{absorption}}{2}\right)^2}.$$

In some embodiments, in the Step S5, the value of the outer diameter of the foam energy-absorbing layer may be corrected by multiplying a thickness of the foam energy-absorbing layer by a safety factor.

The embodiments have the following beneficial effects.

The embodiments are mainly based on a design concept of energy conversion and "turning blockage into drainage", and adopts a flexible protective device. The effectiveness and feasibility of the flexible protective device have been confirmed in other related engineering practice fields such as ship-bridge collision, and can effectively make up the deficiencies of passive safety protection in train derailment. The installation of the arresting system does not affect the original line pattern, and the arresting system can be installed on both existing lines and newly built lines, either in the whole line or only in some dangerous sections (such as through curves and turnouts). The whole system has a simple structure and strong operability and versatility, which can effectively arrest derailed trains and prevent the occurrence of secondary disasters, thus achieving the purpose of protecting trains and drivers and passengers.

LIST OF THE REFERENCE CHARACTERS

1 passive protection arresting device; 2 upright post; 3 cross beam; 4 clamp; 5 stainless-steel inner shell and stainless-steel outer shell; 6 foam energy-absorbing layer; 7 bolt; 8 slewing ring; and 9 train.

DETAILED DESCRIPTION OF THE EMBODIMENTS

The present disclosure is further described in detail below with reference to the accompanying drawings.

EMBODIMENT

Figure 1:
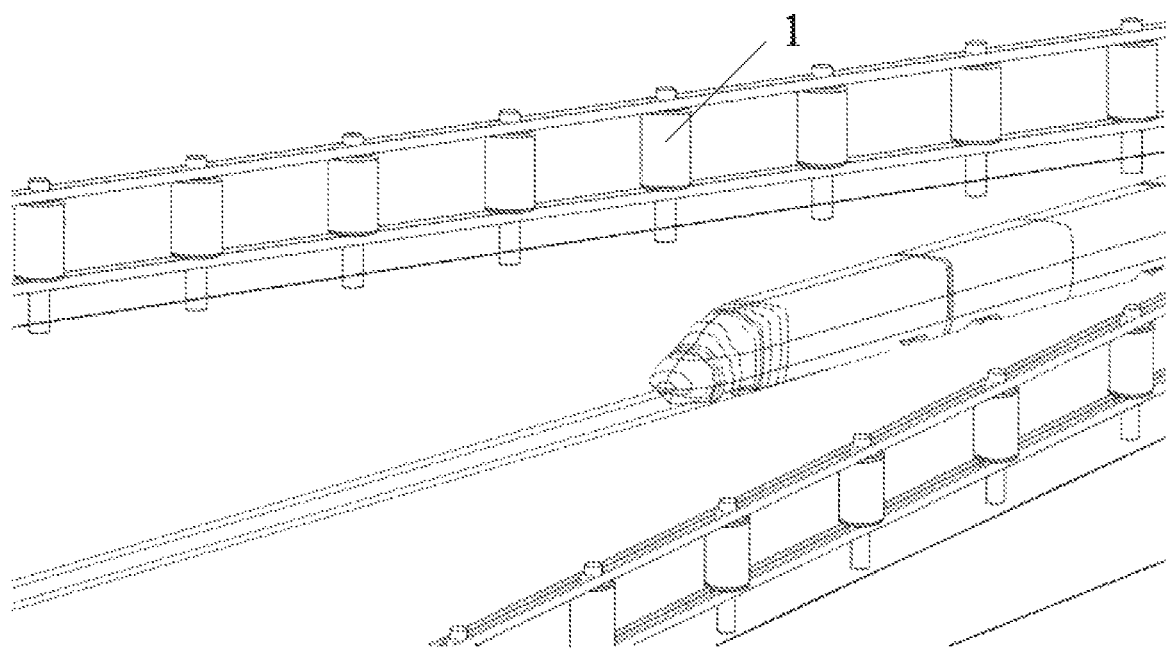
FIG. 1 is a schematic diagram of an overall structure in accordance with an embodiment of the present disclosure.
Figure 2:
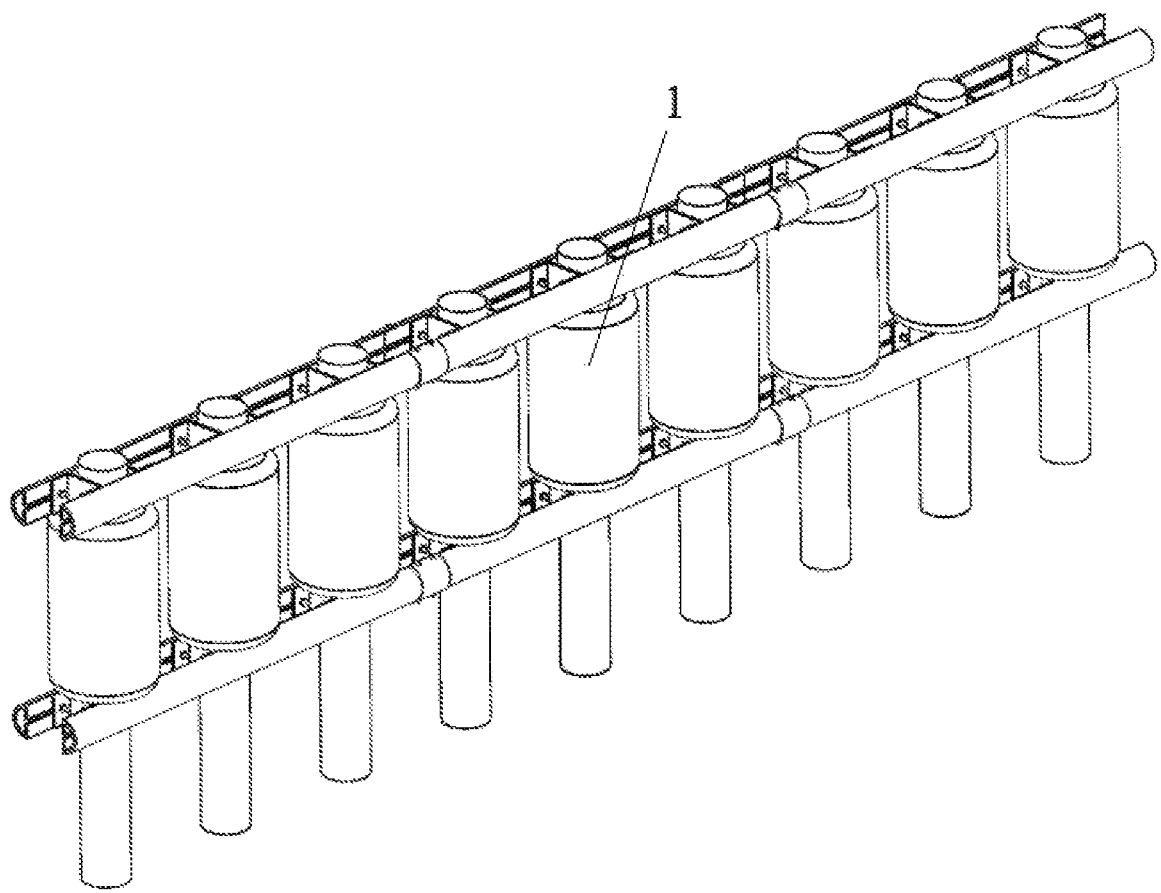
FIG. 2 is a structural schematic diagram of passive protection arresting devices in accordance with the embodiment of the present disclosure.
Figure 3:
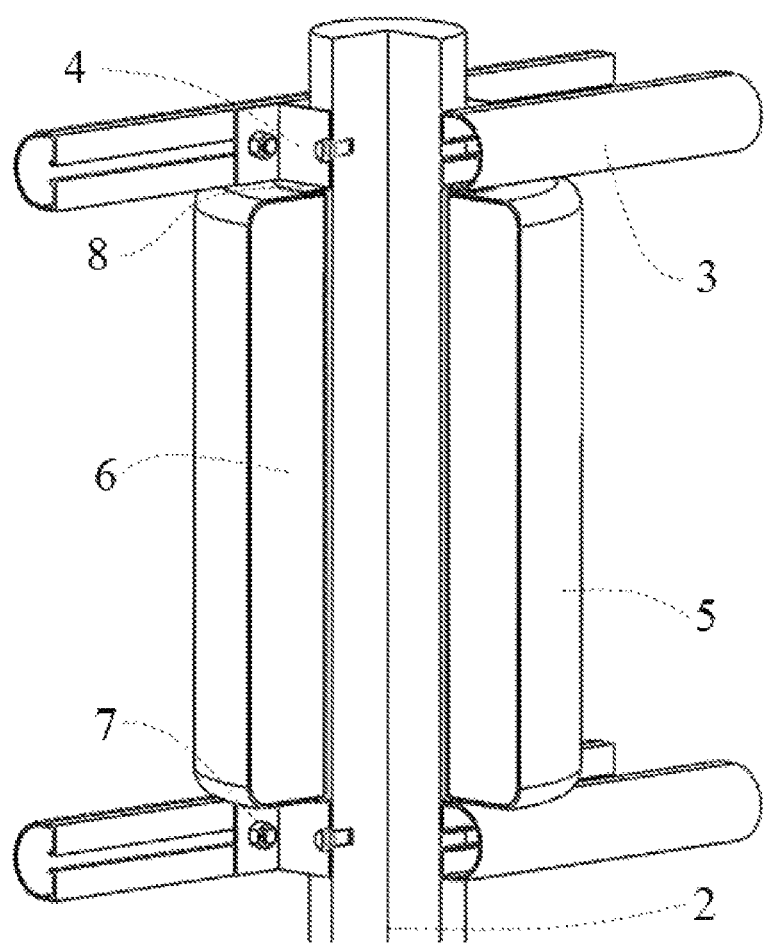
FIG. 3 is a schematic diagram of a single passive protection arresting device in accordance with the embodiment of the present disclosure.

As shown in FIG. 1 to FIG. 3, a high-speed train derailment arresting system includes multiple passive protection arresting devices 1 arranged on both sides of a high-speed railway line.

Each passive protection arresting device 1 includes a rigid support assembly and a flexible rotating structure including a foam energy-absorbing layer 6, a stainless-steel inner shell and a stainless-steel outer shell 5. The flexible rotating structure may also be called a rotating protective barrel. The rotating structure is installed on the support assembly. The support assemblies are configured to be fixed to both sides of the high-speed railway line, and are made of steel.

The support assembly includes an upright post 2, cross beams 3 and clamps 4. Specifically, the clamp 4 and the cross beam 3 are connected by a bolt 7, and a slewing ring 8 is arranged between each of both ends of the stainless-steel inner shell and the stainless-steel outer shells 5 and the cross beam 3.

A structural design method for the high-speed train derailment arresting system is further provided in the embodiment, and specifically includes the following steps.

In Step S1, initial kinetic energy of a train 9 is calculated, and an energy conservation equations of structures participating in energy absorption is listed according to energy conservation.

In Step S2, an energy conversion rate that the high-speed train derailment arresting system needs to reach is set, the energy conservation equations of the Step S1 is simplified and an energy absorption ratio of the upright posts to the rotating protective barrels is preliminarily determined, thereby an amount of energy absorbed by the upright posts and energy absorbed by the rotating protective barrels is determined.

In Step S3, a number of the upright posts and a number of the rotating protective barrels participating in the energy absorption is estimated, an average energy absorption value of the upright posts and an average energy absorption value of the rotating protective barrels are further determined, respectively, and a single upright post and a single rotating protective barrel are designed according to the average energy absorption value of the upright posts and the average energy absorption value of the rotating protective barrels.

Step S4, according to a height of a train body of the train, a height from a nose tip of a high-speed train head to the ground, a height of the upright post, including the height above the ground and an embedded height of the upright post in the concrete foundation while considering to reserve a design space for subsequent rotating protective barrel is preliminarily set, a transverse dynamic deformation value of the upright posts is set, and a rotation angle of a supporting hinge point is calculated, and a bending energy balance equation of the upright posts is listed based on a Parkes model, thereby a diameter of the upright posts is calculated.

Step S5, according to a height from the nose tip of the high-speed train head to the ground, the nose tip of the high-speed train head and a center of the rotating protective barrel are ensured in the same horizontal plane, and a height from the center of the rotating protective barrel to the ground is preliminarily determined; on the premise of guaranteeing economy, the contact area of the high-speed train head and the rotating protective barrel is increased as much as possible, a height of the foam energy-absorbing layer is preliminarily set according to a front end structure of the high-speed train head, average energy absorption value of the foam energy-absorbing layer per unit volume is obtained according to a stress-strain curve integral of a foam material, an outer diameter of the foam energy-absorbing layer from the average energy absorption value of the foam energy-absorbing layer and the average energy absorption value of the rotating protective barrel in the Step S3 is calculated through a simultaneous equation, and a value of the outer diameter is corrected.

Step S6, a dimension of the cross beam, a dimension of the clamp, a dimension of the slewing ring, a dimension of the bolt and a dimension of the nut are properly selected as long as structural and functional requirements are satisfied.

In the Step S1, the energy conservation equation of the structures participating in energy absorption is obtained as follows:

$$E_{total} = \frac{1}{2}mv_1^2 = E_{post} + E_{barrel} + E_1 + E_2 + E_3 + \frac{1}{2}mv_2^2 \quad (1)$$

where m is a mass of the train, $v_1$ is a speed before a collision between the train and the high-speed train derailment arresting system, $E_{post}$ is the sum of energy absorbed by all upright posts, $E_{barrel}$ is the sum of energy absorbed by all rotating protective barrels, $E_1$ is a friction work between the train and the ground, $E_2$ is energy absorbed by train deformation, $E_3$ includes a friction work between the rotating protective barrels and the upright posts, the slewing rings and the train, a friction work between the slewing rings and the cross beams, the clamps and the upright posts, and energy absorbed by the cross beams, the clamps, the bolts, the nuts and the slewing rings, and $v_2$ is a speed of the train when the high-speed train derailment arresting system completes a guiding effect on the train.

In the Step S2, the energy conversion rate that the high-speed train derailment arresting system needs to reach is set, the energy conservation equation in the Step S1 is simplified, $E_1$ (the friction work between the train and the ground), $E_2$ (the energy absorbed by train deformation), and $E_3$ (the friction work between the rotating protective barrels and the upright posts, the slewing rings and train, the friction work between the slewing rings and the cross beams, the clamps and the upright posts, and the energy absorbed by the cross beams, the clamps, the bolts, the nut and the slewing rings) are ignored, thus an energy equation is obtained as follows:

$$E_4 = E_{post} + E_{barrel} = \frac{1}{2}mv_1^2(1-k) \quad (2)$$

where k is the energy conversion rate (in which $$k = \frac{\frac{1}{2}mv_2^2}{\frac{1}{2}mv_1^2}).$$

In the Step S2, the energy absorption ratio of the upright posts to the rotating protective barrels is preliminarily determined, it is assumed that the sum of the energy absorbed by all the upright posts accounts for $\beta$ of $E_4$, thus the energy absorbed by the upright posts and the energy absorbed by the rotating protective barrels are determined as follows:

$$E_{post} = \beta E_4 = \frac{1}{2}\beta mv_1^2(1-k) \quad (3)$$

$$E_{barrel} = (1-\beta)E_4 = \frac{1}{2}(1-\beta)mv_1^2(1-k). \quad (4)$$

In the Step S3, the number of the upright posts and the number of the rotating protective barrels participating in the energy absorption are specifically as follows:

$$n \approx \frac{c}{f}; \quad (5)$$

where c is a portion of the high-speed train derailment arresting system that interacts with the train in a period from the train comes into contact with the high-speed train derailment arresting system until the high-speed train derailment arresting system completes a guiding effect on the train, f is a spacing between adjacent upright posts, and n is an integer.

In the Step S3, the average energy absorption value of the upright posts and the average energy absorption value of the rotating protective barrels are obtained as follows:

$$E_{post\,x} = \frac{E_{post}}{n} = \frac{E_{post\,1} + E_{post\,2} + E_{post\,3} + \ldots + E_{post\,n}}{n}; \quad (6)$$

$$E_{barrel\,y} = \frac{E_{barrel}}{n} = \frac{E_{barrel\,1} + E_{barrel\,2} + E_{barrel\,3} + \ldots + E_{barrel\,n}}{n}; \quad (7)$$

where $E_{post\,n}$ is energy absorbed by a n-th deformed post, $E_{barrel\,n}$ is energy absorbed by a n-th deformed rotating protective barrel.

As the stainless-steel outer shell mainly plays a protective role on the foam energy-absorbing layer, a thickness of a stainless-steel layer of the stainless-steel outer shell in a preliminary design is low. In order to simplify the calculation, an energy absorption effect of the stainless-steel outer shell is ignored, and only energy absorption $D_{absorption\,y}$ of the foam energy-absorbing layer is considered, namely:

$$D_{absorption\,y} = E_{barrel\,y} \quad (8).$$

In the Step S4, a transverse dynamic deformation value of the upright post is set, and according to a height from a nose tip of a high-speed train head to the ground, a height of the upright posts, including the height above the ground and an embedded height of the upright post in the concrete foundation, is preliminarily set, while considering to reserve a design space for subsequent rotating protective barrel, and the bending energy balance equation of the upright post listed based on the Parkes model is obtained as follows:

$$E_{post\,x} = M_u\theta = \sigma_s W_s\theta = \sigma_s \alpha W_z\theta = \sigma_s \alpha \frac{\pi D_{post}^3}{32}\theta; \quad (9)$$

where $M_u$ is an ultimate bending moment, $\theta$ is a rotation angle of the supporting hinge point, $\sigma_s$ is yield strength of a material, $W_s$ is a plastic bending section coefficient, $W_z$ is a bending section coefficient (in which the bending section coefficient a circular section is $$W_z = \frac{\pi D_{post}^3}{32}),$$

α is a section shape coefficient (in which the circular section of the circular section is $$\alpha = \frac{16}{3\pi}),$$

and $D_{post}$ is the diameter of the upright post.

In the Step S4, according to a height of a train body, a height from a nose tip of a high-speed train head to the ground, a height of the upright post, including the height above the ground and an embedded height of the upright post in the concrete foundation, is preliminarily set, while considering to reserve a design space for subsequent rotating protective barrel, the transverse dynamic deformation value of the upright post is set, and the rotation angle of the supporting hinge point is obtained as follows:

$$\theta \approx \frac{\pi \arcsin\left(\frac{P}{l_1}\right)}{180°};\qquad(10)$$

where P is a transverse dynamic deformation value of the upright posts that is a transverse horizontal displacement of the upright post relative to an initial position after bending deformation, and $l_1$ is the height of the upright post above the ground.

In some embodiments, in the step S4, the diameter of the upright post is obtained as follows by simultaneous equations (3), (5) (6), (9) and (10):

$$D_{post} = \sqrt[3]{\frac{3\beta f m v_1^2 (1-k)}{\sigma_s c \frac{\pi \arcsin\left(\frac{P}{l_1}\right)}{180°}}}.\qquad(11)$$

In the Step S5, according to a height from the nose tip of the high-speed train head of an EMU to the ground, it is ensured that the nose tip of the high-speed train head and the center of the rotating protective barrel are in the same horizontal plane, and then a height from the center of the rotating protective barrel to the ground is preliminarily determined. On the premise of guaranteeing the economy, the contact area between the high-speed train head and the rotating protective barrel is increased as much as possible, a height of the energy-absorbing layer is preliminarily set according to a front-end structure of the high-speed train head.

In the Step S5, the average energy absorption of the foam per unit volume is obtained according to a stress-strain curve integral of the foam material, and the outer diameter of the foam energy-absorbing layer is calculated from the average energy absorption of the foam per unit volume and the average energy absorption value of the rotating protective barrel in the Step S3 through a simultaneous equation.

The average energy absorption of the foam material per unit volume of the energy-absorbing layer is obtained as follows:

$$e_f = \int_0^{\varepsilon_p} \sigma\, d\varepsilon\qquad(12)$$

where ε is strain, σ is stress, and $\varepsilon_p$ is average strain of the foam material of the foam energy-absorbing layer.

The volume of the foam energy-absorbing layer is obtained as follows:

$$V_{absorption} = \frac{E_{absorption\,y}}{e_f}\qquad(13)$$

$$V_{absorption} = \pi\left[\left(\frac{D_{absorption}}{2}\right)^2 - \left(\frac{d_{absorption}}{2}\right)^2\right]L_{absorption};\qquad(14)$$

where $D_{absorption}$ is the outer diameter of the foam energy-absorbing layer, $D_{absorption}$ is an inner diameter of the foam energy-absorbing layer, and $L_{absorption}$ is a height of the foam energy-absorbing layer.

The outer diameter $D_{absorption}$ of the foam energy-absorbing layer can be obtained through simultaneous equations (4), (5), (7), (8), (13) and (14):

$$D_{absorption} = 2\sqrt{\frac{(1-\beta)fmv_1^2(1-k)}{2\pi c e_f L_{absorption}} + \left(\frac{d_{absorption}}{2}\right)^2}\qquad(15)$$

In the step S5, because the average strain reaches densification strain, the whole area of the foam energy-absorbing layer is considered to participate in the deformation. However, in fact, only part of the area of the rotating protective barrel is in contact with the train, which leads to the deformation of the foam energy-absorbing layer. The protection arresting device cannot achieve the expected protection effect as the calculated thickness of the energy-absorbing layer is small, leading to poor safety. Therefore, in order to ensure safety, the value of the outer diameter of the foam energy-absorbing layer is corrected by multiplying the thickness of the foam energy-absorbing layer by the safety factor.

In the Step S6, the dimension of the cross beam, the dimension of the clamp, the dimension of the slewing ring, the dimension of the bolt and the dimension of the nut are properly selected as long as structural and functional requirements are satisfied.

This embodiment is further described below.

As shown in FIG. 1, the high-speed train derailment arresting system and the structural design method therefor are provided. The system includes multiple passive protective arresting devices arranged on both sides of the high-speed railway line, which can effectively arrest derailed trains, prevent secondary disasters, and achieve the purpose of protecting trains and drivers and passengers. Corresponding protective arresting devices are arranged outside gauges on both sides of the high-speed railway.

In this embodiment, considering the durability of the rotating structure, the rotating structure adopts a three-layer sandwich structure, the outermost layer and the innermost layer are both made of stainless steel, and the middle foam energy-absorbing layer is made of a foam material, such that the rotating structure not only can play a role of buffering and energy absorption while guaranteeing the durability, but also can reduce the friction between the rotating structure and the upright post.

In this embodiment, in order to cooperate with the rotating structure to better play a role of energy dissipation and transfer, the support assembly includes an upright post, cross beams and clamps. In order to ensure the strength of the support assembly, as a preferred embodiment, the support assembly is made of steel.

In this embodiment, in order to reduce an impact force when the train impacts against the arresting system, the passive protection arresting device 1 includes the rigid support assembly and the flexible rotating structure. The rotating structure is installed on the support assembly, and the support assemblies are configured to be fixed to both sides of the high-speed railway line.

In this embodiment, on the premise of not affecting the normal running of trains, corresponding protective arresting devices are arranged on both sides of the high-speed railway lines (such as viaducts and sections with complex line conditions), thus forming an integral arresting system outside the gauges of the high-speed train.

Because the train has large kinetic energy/momentum when running at a high speed, when the train impacts against the protection system at the high speed, the impact energy is difficult to dissipate in a short time. Therefore, it is unrealistic to resist the huge energy generated by the train when colliding with the protection system only by means of the traditional high-strength protection structure, and it is difficult to arrest the train.

In this embodiment, the main principle of the provided derailment arresting system is based on transfer and dissipation of the impact energy. When the high-speed train derails due to collision or other factors and then impacts against the protection arresting devices, the rotating structures in the arrest system rub against the surface of the train to enable the rotating structures to rotate and roll around the upright posts. Therefore, the huge energy during impact is transformed into kinetic energy during rotation, the transfer of energy is achieved, and the impact duration is prolonged while the effect of buffering energy dissipation is achieved. According to the momentum theorem, in a case that the momentum change is fixed, increasing the action time of force can reduce the impact force and protect the train. Meanwhile, the impact force originally concentrated in one area is dispersed to outer surfaces of the whole rotating structures, which reduces the possibility that the protection arresting devices are damaged after being hit, thus playing a role of arresting the derailed train. Moreover, the strength and rigidity of the structure should be guaranteed to resist the impact of high-speed trains under huge impact energy without causing structural damage.

The arresting system has a unique structural design and a material configuration. In order to reduce the impact force when the train impacts against the arresting system, the anti-collision material is required to have low structural dynamic generalized wave impedance. The rotating structures can be supported and positioned by an upper steel structure and a lower steel structure, so as to cooperate with the rotating structures in the middle to better play a role of energy dissipation and transfer.

Viscous energy dissipation can buffer an impact process between the train and the arresting devices, prolong the impact duration, and create favorable conditions for the train to turn and slide away in a low stress state and take away as much residual kinetic energy as possible after friction collision with the rotating structures, thus making the arresting devices have impact flexibility in the sense of low wave impedance and viscous energy dissipation mechanism in the sense of buffering the impact process. When the train derails due to various reasons and impacts against the arresting system, the arresting system can use the viscous energy dissipation mechanism to transform the huge energy during the impact into the rotating kinetic energy of the structure for dissipation. Such a special rotating structure design can greatly absorb the impact force and reduce the impact energy, thus avoiding the occurrence of secondary disasters after the train derailment and highly protecting the train and drivers and passengers.

Experiment

Taking a certain type of train as an example, and the structural design method is explained in detail.

This type of train has a curb weight of 375.8 t and a train body height of 3,700 mm. The speed $v_1$=36 km/h before the train impacts against the arresting system is selected as the preliminary design speed. From the time that the train is in contact with the arresting system until the time that the arresting system completes the guiding effect on the train, the length of a portion of the arresting system that interacts with the train is at least a body length of a high-speed train head, which is 25,250 mm, so the length c of the portion of the arresting system that interacts with the train from the time that the train is in contact with the arresting system until the time that the arresting system completes the guiding effect is selected as 25,250 mm in the preliminary design. In order to ensure the protection effect and economy, a spacing between the upright posts is preliminarily selected as 1,000 mm. Considering to reserve a design space for the subsequent rotating protective barrel and the cross beam, the height of the upright post is initially designed to be 2,000 mm, of which the height of the upright post in the concrete foundation is 400 mm, and the height $l_1$ of the upright post above the ground is equal to 1,600 mm.

Q345 steel with strong stiffness is used for the upright post in the preliminary design. In order to achieve 80% energy conversion rate, the foam energy-absorbing layer should absorb more energy as much as possible, and the energy absorbed by the upright post should be as little as possible, so β is selected as 30% in the preliminary design. Considering the safety, the transverse dynamic deformation value P of the upright post is selected as 300 mm. By substituting the numerical value into formula (11), $D_{post}$ is calculated to be 160.272 mm. Considering that the upright post should be convenient for machining, $D_{post}$ is equal to 160 mm.

Figure 4:
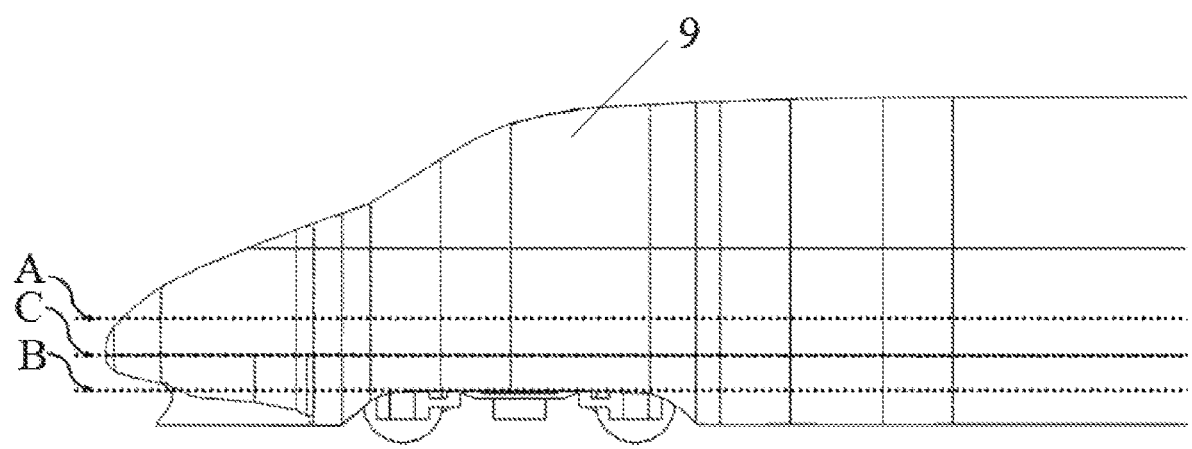
FIG. 4 is a schematic diagram of expected action range of a rotating protective barrel and a train in accordance with the embodiment of the present disclosure.

A height from a nose tip of a high-speed train head of a certain EMU to the ground is approximately 950 mm. In order to make the rotating protective barrel fully work with the train to complete the guidance, it should be ensured that the nose tip of the high-speed train head and the center of the rotating protective barrel are at the same horizontal plane. In the preliminary design, the height from the center of the rotating protective barrel to the ground is 950 mm. On the premise of ensuring economy, the contact area between the high-speed train head and the rotating protective barrel should be increased as much as possible, such that an A part and a B part of the high-speed train head may make contact with the rotating protective barrel (as shown in FIG. 4, in which A and B are symmetrical about C, and C is a horizontal line where the nose tip is located), the height between the A part and the B part of the high-speed train head is about 800 mm, and the height $L_{absorption}$ of the energy-absorbing layer is 800 mm in the preliminary design. From the above design, it can be seen that the diameter $D_{post}$ of the upright post is 160 mm. Considering that installation allowance should be reserved and the size of the stainless-steel outer shell, an inner diameter $D_{absorption}$ of the energy-absorbing layer is 175 mm in the preliminary design.

Combined with excellent characteristics of a foamed aluminum material, the middle energy-absorbing layer is made of foamed aluminum with a relative density of 0.21, $e_f$ of the foamed aluminum is equal to $6.1336 \times 10^6$ J. By substituting the numerical value into formula (15), it is obtained that the outer diameter $D_{absorption1}$ of the energy-absorbing layer is equal to 240.121 mm, and the thickness $t_1$ of the energy-absorbing layer is equal to 32.5605 mm. Because the average strain reaches densification strain, the whole area of the foam energy-absorbing layer is considered to participate in the deformation. However, in fact, only part of the area of the rotating protective barrel is in contact with the train, which leads to the deformation of the foam energy-absorbing layer. The protection arresting device cannot achieve the expected protection effect as the calculated thickness of the energy-absorbing layer is small, leading to poor safety. Therefore, in order to ensure safety, the thickness which is 97.6815 mm is obtained by multiplying the result by the safety factor of 3. So, the outer diameter $D_{absorption}$ of the energy-absorbing layer is equal to 370.363 mm, and $D_{absorption}=370$ mm is taken for the convenience.

Considering its economy, service life and convenience for machining, each of the cross beam, the clamp and the slewing ring is made of 304 stainless steel, the thickness of each of the cross beam and the clamp is selected as 4 mm, and the thickness of slewing ring is selected as 2 mm. A cup head square neck bolt should meet the requirements of Standard GB/T 12, a hexagon head bolt should meet the requirements of Standard GB/T 5780, and a hexagon nut should meet the requirements of Standard GB/T 6170.

To sum up, the design of the train derailment arresting device follows the following scientific concepts. (1) By means of the idea of "turning blockage into drainage", the energy conversion is the main way, supplemented by energy absorption and energy dissipation, to achieve the transformation of huge impact energy. (2) The protection arresting device of "coupling rigidity with softness and with high strength and wear resistance" is adopted. (3) The train is enabled to slide away as soon as possible after impacting against the protection arresting devices, and as much residual kinetic energy as possible is taken away while changing the impact concentrated force into a distributed load. (4) Impact flexibility in the sense of low wave impedance and viscous energy dissipation mechanism in the sense of buffering impact process are achieved.

The above embodiments represent only several embodiments of the present disclosure, and the description thereof is specific and detailed, but should not therefore be construed as limiting the scope of the present disclosure. It should be noted that for those of ordinary skill in the art, several variations and modifications can be made without departing from the concept of the present disclosure, all of which fall within the scope of protection of the present disclosure.

What is claimed is:

1. A structural design method for a high-speed train derailment arresting system, wherein high-speed train derailment arresting system comprises a plurality of passive protection arresting devices arranged on both sides of a high-speed railway line, each of the plurality of passive protection arresting devices comprises a rigid support assembly fixed to a respective side of the high-speed railway line, and a rotating protective barrel arranged on the rigid support assembly; the rigid support assembly comprises cross beams, clamps, and an upright post fixed to the respective side of the high-speed railway line, the rotating protective barrel is sleeved on the upright post and supported by the cross beams, and the cross beams are fixed to the upright post through the clamps; and the rotating protective barrel comprises a stainless-steel inner shell and a stainless-steel outer shell, and a foam energy-absorbing layer is arranged between the stainless-steel inner shell and the stainless-steel outer shell;

the structural design method comprising:

Step S1, calculating initial kinetic energy of a train, and listing an energy conservation equation of structures participating in energy absorption according to energy conservation;

wherein in the Step S1, the energy conservation equation of the structures participating in energy absorption is obtained as follows:

$$E_{total} = \frac{1}{2}mv_1^2 = E_{post} + E_{barrel} + E_1 + E_2 + E_3 + \frac{1}{2}mv_2^2$$

wherein m is a mass of the train, $v_1$ is a speed before a collision between the train and the high-speed train derailment arresting system, $E_{post}$ is a sum of energy absorbed by all upright posts, $E_{barrel}$ is a sum of energy absorbed by all rotating protective barrels, $E_1$ is a friction work between the train and a ground, $E_2$ is energy absorbed by train deformation, $E_3$ comprises a friction work between the rotating protective barrels and the upright posts, the slewing rings and the train, a friction work between the slewing rings and the cross beams, the clamps and the upright posts, and energy absorbed by the cross beams, the clamps, the bolts, the nuts and the slewing rings, and $v_2$ is a speed of the train when the high-speed train derailment arresting system completes a guiding effect on the train;

Step S2, setting an energy conversion rate that the high-speed train derailment arresting system needs to reach, simplifying the energy conservation equation of the Step S1 and preliminarily determining an energy absorption ratio of upright posts to rotating protective barrels, thereby determining an amount of energy absorbed by the upright posts and energy absorbed by the rotating protective barrels;

wherein in the Step S2, the energy conversion rate that the high-speed train derailment arresting system needs to reach is set, the energy conservation equation in the Step S1 is simplified, the friction work $E_1$ between the train and the ground, the energy $E_2$ absorbed by train deformation, $E_3$ which comprises the friction work between the rotating protective barrels and the upright posts, the slewing rings and train, the friction work between the slewing rings and the cross beams, the clamps and the upright posts, and the energy absorbed by the cross beams, the clamps, the bolts, the nuts and the slewing rings are ignored, thus an energy equation is obtained as follows:

$$E_4 = E_{post} + E_{barrel} = \frac{1}{2}mv_1^2(1-k);$$

wherein k is the energy conversion rate, and $$k = \frac{\frac{1}{2}mv_2^2}{\frac{1}{2}mv_1^2};$$

and wherein in the Step S2, assuming that the sum of energy absorbed by all upright posts accounts for β of $E_4$, the energy absorbed by the upright posts and the energy absorbed by the rotating protective barrels are determined as follows:

$$E_{post} = \beta E_4 = \frac{1}{2}\beta m v_1^2 (1-k)$$

$$E_{barrel} = (1-\beta)E_4 = \frac{1}{2}(1-\beta)m v_1^2 (1-k);$$

Step S3, estimating a number of the upright posts and a number of the rotating protective barrels participating in the energy absorption, further determining an average energy absorption value of the upright posts and an average energy absorption value of the rotating protective barrels, respectively, and designing a single upright post and a single rotating protective barrel according to the average energy absorption value of the upright posts and the average energy absorption value of the rotating protective barrels;

wherein in the Step S3, estimating the number of the upright posts and the number of the rotating protective barrels participating in the energy absorption is obtained specifically as follows:

$$n \approx \frac{c}{f};$$

wherein c is a length of a portion of the high-speed train derailment arresting system that interacts with the train in a period from the train comes into contact with the high-speed train derailment arresting system until the high-speed train derailment arresting system completes a guiding effect on the train, f is a spacing between adjacent upright posts of the upright posts, and n is an integer;

wherein in the Step S3, a method for respectively determining the average energy absorption value of the upright posts and the average energy absorption value of the rotation protective barrels is obtained as follows:

$$E_{post\,x} = \frac{E_{post}}{n} = \frac{E_{post\,1} + E_{post\,2} + E_{post\,3} + \ldots + E_{post\,n}}{n}$$

$$E_{barrel\,y} = \frac{E_{barrel}}{n} = \frac{E_{barrel\,1} + E_{barrel\,2} + E_{barrel\,3} + \ldots + E_{barrel\,n}}{n};$$

wherein $E_{post\,n}$ is energy absorbed by a n-th deformed upright post of the upright posts, and $E_{barrel\,n}$ is energy absorbed by a n-th deformed rotating protective barrel of the rotating protective barrels;

as the stainless-steel outer shell mainly plays a protective role on the foam energy-absorbing layer, a thickness of a stainless-steel layer of the stainless-steel outer shell in a preliminary design is low; and in order to simplify calculation, an energy absorption effect of the stainless-steel outer shell is ignored, and only energy absorption $E_{absorption\,y}$ of the foam energy-absorbing layer is considered, that is:

$$E_{absorption\,y} = E_{barrel\,y}$$

Step S4, according to a height of a train body of the train and a height from a nose tip of a high-speed train head to the ground, preliminarily setting a height of the upright posts while considering to reserve a design space for the rotating protective barrels, setting a transverse dynamic deformation value of the upright posts, calculating a rotation angle of a supporting hinge point of the upright posts, and listing a bending energy balance equation of the upright posts based on a Parkes model, thereby calculating a diameter of the upright posts, wherein the height of the upright posts comprises a height above the ground and an embedded height of the upright posts in concrete foundation;

wherein in the Step S4, a bending energy balance equation of the upright post listed based on the Parkes model is obtained as follows:

$$E_{post\,x} = M_u \theta = \sigma_s W_s \theta = \sigma_s \alpha W_z \theta = \sigma_s \alpha \frac{\pi D_{post}^3}{32}\theta;$$

wherein $M_u$ is an ultimate bending moment, $\theta$ is a rotation angle of the supporting hinge point, $\sigma_s$ is yield strength of a material, $W_s$ is a plastic bending section coefficient, $W_z$ is a bending section coefficient, wherein the bending section coefficient of a circular section is $$W_z = \frac{\pi D_{post}^3}{32},$$

$\alpha$ is a section shape coefficient, the section shape coefficient of the circular section is $$\alpha = \frac{16}{3\pi};$$

and $D_{post}$ is the diameter of the upright posts;

a method for calculating the rotation angle of the supporting hinge point is obtained as follows:

$$\theta \approx \frac{\pi \arcsin\left(\frac{P}{l_1}\right)}{180°};$$

wherein P is a transverse dynamic deformation value of the upright posts that is a transverse horizontal displacement of the upright posts relative to an initial position after bending deformation, and $l_1$ is the height of the upright posts above the ground; and wherein in the Step S4, a method for calculating the diameter of the upright posts is $$D_{post} = \sqrt[3]{\frac{3\beta f m v_1^2 (1-k)}{\sigma_s c \dfrac{\pi \arcsin\left(\frac{P}{l_1}\right)}{180°}}}$$

Step S5, according to a height from the nose tip of the high-speed train head of an electric multiple unit (EMU) to the ground, ensuring that the nose tip of the high-speed train head and a center of each of the rotating protective barrels are in a same horizontal plane, and preliminarily determining a height from the center of the each of the rotating protective barrels to the ground; preliminarily setting a height of the foam energy-absorbing layer according to a front end structure of the high-speed train head, and obtaining average energy absorption value of the foam energy-absorbing layer per unit volume according to a stress-strain curve integral of a foam material, calculating an outer diameter of the foam energy-absorbing layer from the average energy absorption value of the foam energy-absorbing layer and the average energy absorption value of the rotating protective barrel in the Step S3 through a simultaneous equation, and correcting a value of the outer diameter of the foam energy-absorbing layer;

wherein in the Step S5, a method for calculating the outer diameter of the foam energy-absorbing layer is as follows:

the average energy absorption of the foam material per unit volume of the foam energy-absorbing layer is obtained as follows:

$$e_f = \int_0^{\varepsilon_p} \sigma d\varepsilon;$$

wherein $\varepsilon$ is strain, $\sigma$ is stress, and $\varepsilon_p$ is average strain of the foam material of the foam energy-absorbing layer;

the volume of the foam energy-absorbing layer is obtained as follows:

$$V_{absorption} = \frac{E_{absorption\ y}}{e_f}$$

$$V_{absorption} = \pi\left[\left(\frac{D_{absorption}}{2}\right)^2 - \left(\frac{d_{absorption}}{2}\right)^2\right]L_{absorption};$$

wherein $D_{absorption}$ is the outer diameter of the foam energy-absorbing layer, $d_{absorption}$ is an inner diameter of the foam energy-absorbing layer, and $L_{absorption}$ is a height of the foam energy-absorbing layer, thus, the outer diameter $D_{absorption}$ of the foam energy-absorbing layer is obtained as follows:

$$D_{absorption} = 2\sqrt{\frac{(1-\beta)fmv_1^2(1-k)}{2\pi ce_f L_{absorption}} + \left(\frac{d_{absorption}}{2}\right)^2};$$

Step S6, properly selecting a dimension of the cross beams, a dimension of the clamps, a dimension of slewing rings, a dimension of bolts and a dimension of nuts as long as structural and functional requirements are satisfied.

2. The structural design method for the high-speed train derailment arresting system according to claim 1, wherein in the Step S5, the value of the outer diameter of the foam energy-absorbing layer is corrected by multiplying a thickness of the foam energy-absorbing layer by a safety factor.

3. The high-speed train derailment arresting system according to claim 1, wherein the upright post, the cross beams and the clamps are made of steel.

* * * * *